(12) United States Patent
Miyashita

(10) Patent No.: US 6,453,172 B1
(45) Date of Patent: Sep. 17, 2002

(54) DUAL BAND PORTABLE PHONE SWITCHABLE BETWEEN DIFFERENT PHONE SYSTEMS

(75) Inventor: Tsutomu Miyashita, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/287,283

(22) Filed: Apr. 7, 1999

(30) Foreign Application Priority Data

Apr. 13, 1998 (JP) .......................................... 10-100993

(51) Int. Cl.[7] ................................................. H04B 1/38
(52) U.S. Cl. ........................ 455/552; 455/426; 455/435
(58) Field of Search ................................ 455/422, 426, 455/434, 432, 435, 551, 552, 553, 575, 73, 550

(56) References Cited

U.S. PATENT DOCUMENTS

| 5,504,803 | A | | 4/1996 | Callahan et al. | |
|---|---|---|---|---|---|
| 5,564,077 | A | * | 10/1996 | Obayashi et al. | 455/553 |
| 6,011,960 | A | * | 1/2000 | Yamada et al. | 455/77 |
| 6,185,422 | B1 | * | 2/2001 | Mattila | 455/552 |

FOREIGN PATENT DOCUMENTS

| DE | 43 44 702 | 7/1995 |
|---|---|---|
| DE | 196 17 441 | 12/1997 |
| JP | 63-203025 | 8/1988 |
| JP | 5-102923 | 4/1993 |
| JP | 9-51321 | 2/1997 |
| JP | 9-121376 | 5/1997 |

* cited by examiner

Primary Examiner—Doris H. To
(74) Attorney, Agent, or Firm—Sughrue Mion, PLLC

(57) ABSTRACT

A dual band portable phone includes a first mobile phone system used in a first mode, a second mobile phone system used in a second mode, a storing section and a control section. The storing section has a mode area for storing a mode data indicative of a current operation mode, a first area for storing a first control channel data indicative of a first control channel used for the first mobile phone system in the first mode, and a second area for storing a second control channel data indicative of a second control channel used for the second mobile phone system in the second mode. The mode data indicates the first mode at present. The control section performs a position registration of the portable phone using the second control channel data stored in the storing section to set the second mode, when a first radio communication using the first mobile phone system becomes impossible while the first radio communication is performed in the first mode. The control section also performs a second radio communication using the second mobile phone system.

19 Claims, 7 Drawing Sheets

DUAL BAND PORTABLE PHONE SWITCHABLE BETWEEN DIFFERENT PHONE SYSTEMS

BACKGROUND OF THE INVENTION

1. Field of the Invention

The present invention relates to a dual band portable phone, and more particularly to a technique for quickly switching from one mobile phone system to another and a method for the same.

2. Description of the Related Art

A PHS (personal handyphone system) is known as a mobile phone system, and employs a cellular technology in which an area size; where electromagnetic wave can be received is up to about 100 meters radially from the base station of each cell. Therefore, it is essential to provide many base stations for a wide service area. While the PHS system is less in service fee than any other mobile phone systems, it is sometimes difficult to receive the electromagnetic wave.

A GSM (global system for mobile communications) uses a larger sized cellular area which is relatively large and hardly concerns the above disadvantage. The GSM system is however higher in the service fee than the PHS system.

To eliminate such disadvantage, a dual band portable phone operable in both the PHS system and the GSM system has been developed. The dual band portable phone usually operates in the PHS mode. When being moved out of the service area for the PHS mode, the portable phone starts operating using the GSM mode. It is now defined that the PHS mode is almode where the dual band portable phone is used as a mobile station of the PHS system and the GSM mode is a mode where the same is used as a mobile station of the GSM system.

When the dual band portable phone is turned on, it starts a function for searching the control channel in either the PHS system or the GSM system. In the PHS system, the channel number (frequency) of the control channel is assigned to each dual band portable phone by a service supplier (an. operator) of the PHS system. The dual band portable phone has a built-in memory in which the channel number is registered such that the control channel of the PHS system can be quickly found.

In the GSM system, the channel number of the control channel may arbitrarily be determined by its operator when desired. This requires the dual band portable phone to search a desired control channel through checking all the available channels for registration of the position. When the dual band portable phone is moved from the service area of the PHS system to the service area of the GSM system, it has to search all the available channels to determine the control channel to be used during the searching action.

A related technology is disclosed as "method of registering the position in mobile radio communication" in Japanese Laid Open Patent Application (JP-A-Showa 63-203025). The method of registering the position in mobile radio communication involves registering the position of a mobile portable phone when it is moved from one cell to another in the mobile phone system. More particularly, while a single control channel is used commonly in different systems, both automatic position registration and manual position registration are enabled. However, in the Japanese Laid Open Patent Application (JP-A-Showa 63-203025), no technique is disclosed for allowing the mobile portable phone to move between the service areas of different mobile phone systems.

Also, "radio communications apparatus and method of radio communications" is disclosed in Japanese Laid Open Patent Application (JP-A-Heisei 9-51321). The reference describes a technology for allocating frequency bands to two communication systems (for CDMA and cordless telephone). However, a technique is not indicated to quickly perform a position registering process when the portable phone is moved between the service areas of the. different mobile phone systems.

Moreover, "CMTS/MCS compatible mobile portable phone" is disclosed in Japanese Laid Open Patent Application (JP-A-Heisei 5-102923). The CMTS/MCS compatible mobile portable phone operates in either of a CMTS mode and an MCS mode when it is turned on. However, the CMTS/MCS compatible mobile portable phone cannot switch from its dedicated mobile phone system to another mobile phone system when it is moved out of the service area of the dedicated mobile phone system and its communication is disabled.

SUMMARY OF THE INVENTION

An object of the present invention is to eliminate the foregoing disadvantages of conventional mobile telephones.

Another object is to provide a dual band portable phone capable of quickly performing a position registering process for another mobile phone system when the portable phone is moved out of a service area of the current mobile phone system.

Still another object of the present invention is to provide a method of switching between different mobile phone systems.

In order to achieve an aspect of the present invention, a dual band portable phone includes a first mobile phone system used in a first mode, a second mobile phone system used in a second mode, a storing section and a control section. The storing section has a mode area for storing a mode data indicative of a current operation mode, a first area for storing a first control channel data indicative of a first control channel used for the first mobile phone system in the first mode, and a second area for storing a second control channel data indicative of a second control channel used for the second mobile phone system in the second mode. The mode data indicates the first mode at present. The control section performs a position registration of the portable phone using the second control channel data stored in the storing section to set the second mode, when a first radio communication using the first mobile phone system becomes impossible while the first radio communication is performed in the first mode. The control section also performs a second radio communication using the second mobile phone system.

The control section may perform the position registration of the portable phone using the second control channel data stored in the storing section to set the second mode, when the portable phone is moved out of a first service area of the first mobile phone system while the first radio communication is performed in the first mode.

Also, the control section may transmit a position registration request to a station for the second mobile phone system using the second control channel data, and may set the mode data indicative of the second mode in the storing section in response to a position registration completion notice from the station to set the second mode.

In addition, the control section may perform a position registration of the portable phone using the first control channel data stored in the storing section in response to a mode change request while the second radio communication is performed in the second mode, set the first mode in response to the position registration of the portable phone using the first control channel data, and perform a radio communication using the first mobile phone system. In this case, the mode change request may be issued when the portable phone is moved out of a service area of the second mobile phone system and into a service area of the first mobile phone system. Instead, the mode change request may be issued when the portable phone is located in a service area of the second mobile phone system and is moved into a service area of the first mobile phone system. Otherwise, the mode change request may be issued when the portable phone is located in a service area of the first mobile phone system and an operation unit is operated.

It is preferable that the control section acquires the first control channel data and the second control channel data in response to a start request, to store in the storing section. In this case, the start request may be issued when a power supply of the portable phone is turned on. Also, the control section sets the mode data indicative of the first mode in the storing section when both of the first control channel data and the second control channel data are acquired or when the first control channel data is acquired. Thus, the control section sets the mode data indicative of the second mode in the storing section when the second control channel data is acquired and when the first control channel data is not acquired.

In addition, the control section selects one having the highest reception electric field intensity level from among control channels for each of the first and second mobile phone systems to store a data corresponding to the one having the highest reception electric field intensity level in the storing section.

In the above, it is preferable that the first mobile phone system is a PHS system and a second mobile phone system is a GSM system.

In order to achieve another aspect of the present invention, a method of performing communication in a dual band portable phone includes:

performing communication using a first mobile phone system in a first mode, a position registration having been performed using the first mobile phone system based on a first control channel data indicative of a first channel predetermined;

switching from the first mobile phone system to a second mobile phone system using a second control channel data indicative of a second channel predetermined such that a second mode is set; and continuing the communication using the second mobile phone system in the second mode.

DESCRIPTION OF THE PREFERRED EMBODIMENTS

A dual band portable phone of the present invention will be described below in detail with reference to the attached drawings.

In the present invention, a PHS system is assigned as a first mobile phone system and a GSM system is assigned as a second mobile phone system.

It is supposed that the dual band portable phone is located at a position where the service areas of two different mobile phone systems, namely the PHS system and the GSM system, overlap each other. In this case, the dual band portable phone carries out registration of its position for the PHS system and saves the channel numbers of the control channels of the GSM system in its memory, when the control channels of their respective mobile phone systems are searched. In case that the dual band portable phone: is moved out of the service area for the PHS system and needs to recall the control channel for the GSM system, the dual band portable phone uses the control channel corresponding to the channel number stored in the memory. Accordingly, no time for searching the control channel is required, so that the registration of the position of the dual band portable phone to the base station in the GSM system can readily be conducted.

Figure 1:
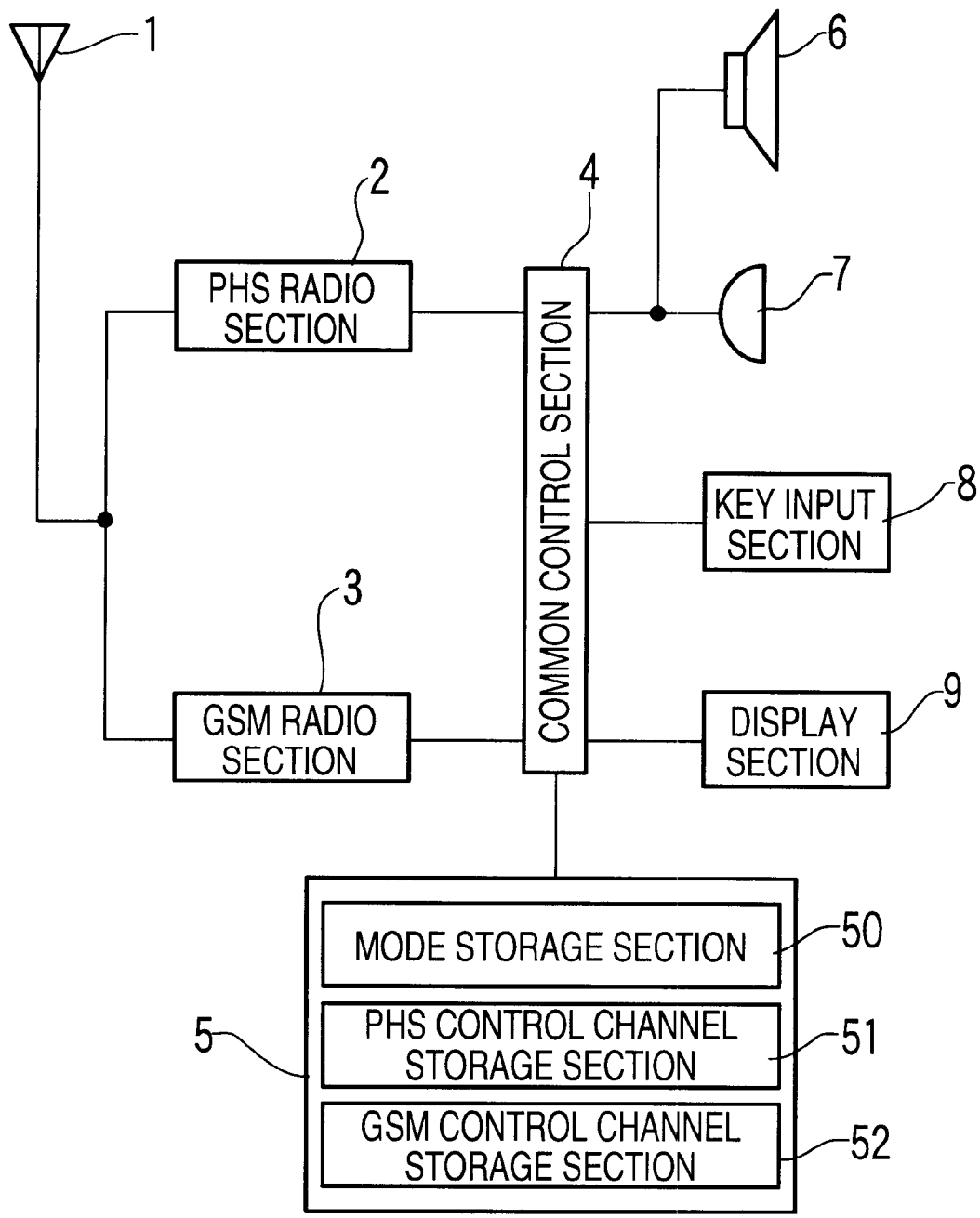
FIG. 1 is a block diagram showing the structure of a dual band portable phone according to an embodiment of the present invention.

FIG. 1 is a block diagram showing a structure of the dual band portable phone of the present invention. The dual band portable phone is composed of a common antenna 1, a PHS radio section 2, a GSM radio section 3, a common control section 4, a memory section 5, a speaker 6, a microphone 7, a key entry 8, and a display section 9.

The common antenna 1 emits into the air, electromagnetic wave converted from an electric signal supplied from the PHS radio section 2 or the GSM radio section 3. The common antenna 1 also converts electromagnetic waves received from a PHS base station and a GSM base station both:(not shown) into electric signals. The converted electric signal is then supplied to the PHS radio section 2 and the GSM radio section 3.

The PHS radio section 2 modulates a data outputted from the common control section 4 to the common antenna 1. Also, the PHS radio section 2 demodulates the electric signal received by the common antenna 1. The demodulated electric signal is supplied as a reception data to the common control section 4. Similarly, the GSM radio section 3 modulates a data outputted from the common control section 4 to the common antenna 1 into an electric signal. Also, the GSM radio section 3 demodulates an electric signal received from the common antenna 1. The demodulated electric signal is supplied as a reception data to the common control section 4.

The common control section 4 controls the entirety of the dual band portable phone. The common control section 4 may be a microprocessor.

The memory section 5 stores therein programs to be executed as well as various data. The common control section 4 executes the programs stored in the memory section 5 to control the operation of the dual band portable phone. The memory section 5 includes a mode storage section 50, a PHS control channel storage section 51 and a GSM control channel storage section 52. The mode storage section 50 stores the current operation mode of the dual band portable phone. The PHS control channel storage section 51 stores the channel number of a PHS control channel. The GSM control channel storage section 52 stores the channel number of a GSM control channel. It is noted that a channel number of the PHS control channel predetermined by the operator is saved in the PHS control channel storage section 51.

The speaker 6 emits a voice sound corresponding to an audio signal supplied from the common control section 4. The microphone 7 converts a voice sound into an electric signal which is supplied to the common control section 4. The key operation section 8 has, for example, a power switch (not shown) for turning on the power supply, a ten-key pad for inputting a dial number, and other controls (not shown). The display section 9 may be an LCD for displaying a symbol indicative of the out-of-area/in-area states, date, time, electric field intensity of the received electromagnetic wave, dial numbers, and other messages.

Figure 2:
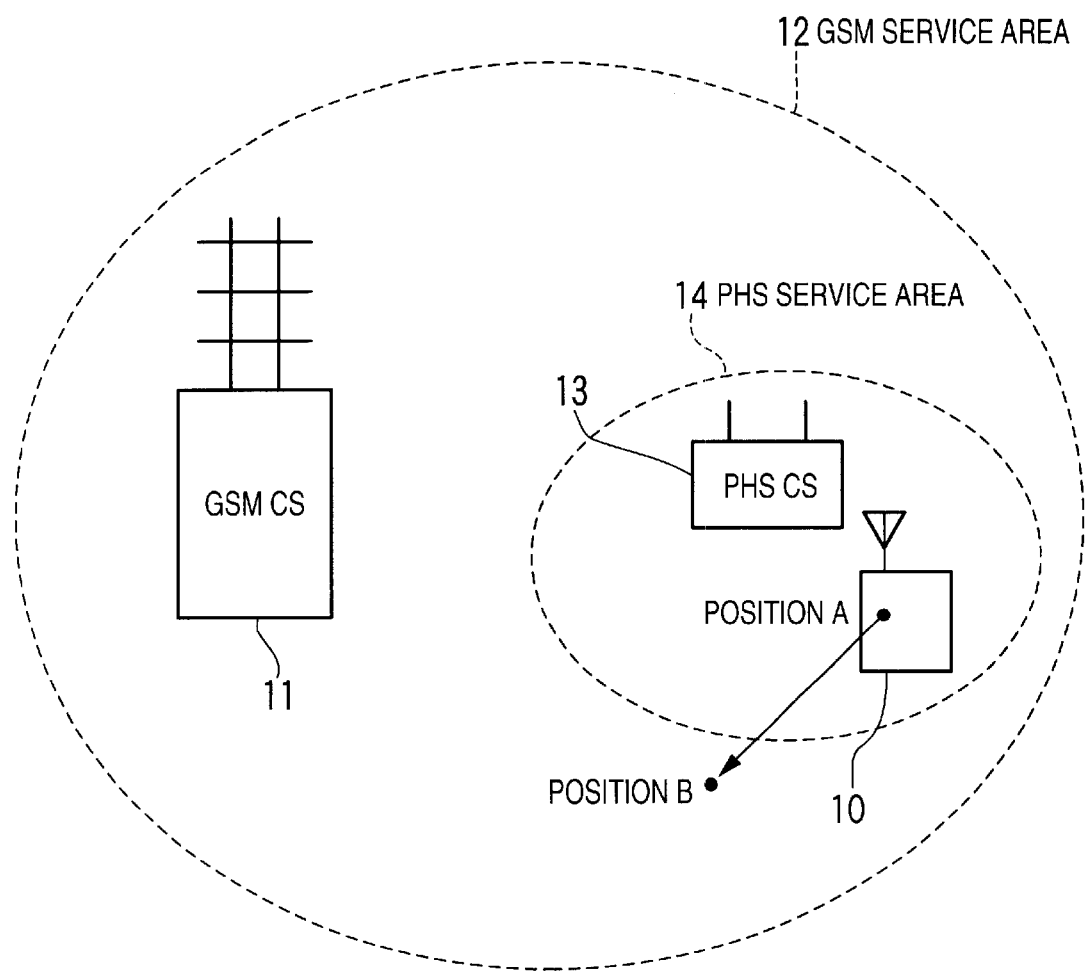
FIG. 2 is a diagram to explain an operation of the dual band portable phone according to the embodiment of the present invention.

The operation of the dual band portable phone having the foregoing construction will be now explained. Referring to FIG. 2, it is supposed in the following description that the GSM base station (GSM CS) 11 covers a GSM service area 12 while the PHS base station (PHS CS) 13 covers a PHS service area 14. The dual band portable phone 10 is about to be moved from a position A where the GSM service area 12 and the PHS service area 14 overlap each other, to a position B which is in the GSM service area 12 but out of the PHS service area 14.

Under such a condition, the operation of the dual band portable phone is as follows. When the dual band portable phone 10 is powered on at the position A, it receives the control channels from both the GSM base station 11 and the PHS base station 13. At this time, the dual band portable phone 10 registers its position to the PHS base station 13 and saves the channel number of the GSM control channel in the GSM control channel storage section 52 of its memory section 5.

Then, as the dual band portable phone 10 is moved from the position A to the position B, it is disabled to receive the control channel of the PHS base station 13. At the moment, the common control section 4 reads out the channel number from the GSM control channel storage section 52 of the memory., section 5 and registers the position to the GSM base station 11 using the control channel corresponding to the channel number.

The operation of the dual band portable phone 10 will be described below in detail with reference to the flowcharts shown in FIGS. 3 to 7.

Figure 3:
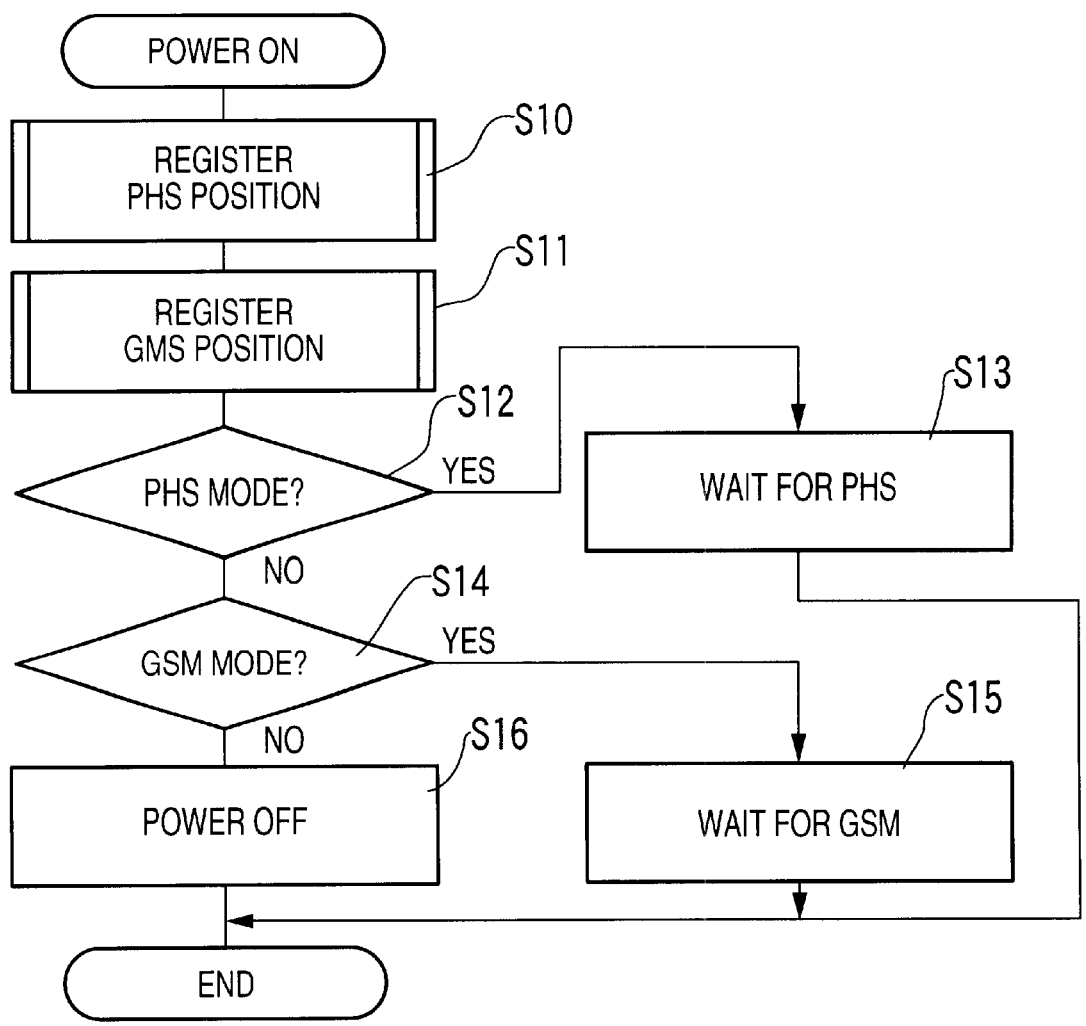
FIG. 3 is a flowchart showing the control of an initial process of the dual band portable phone according to the embodiment of the present invention.

(1) Initial Process (FIG. 3)

The initial process will be described with reference to the flowchart shown in FIG. 3. The routine of the initial process is initiated when the power supply is turned on. More specifically, when a power switch on the key operation section 8 is operated, a start request signal is issued at the same time as the power supply is turned on. A PHS position registration process is carried out in response to the start request (Step S10). In the PHS position registration process, registration its position to the PHS base station 13 is performed when the dual band portable phone 10 is located in the PHS service area 14, as will be described later in more detail. As a result, its operation mode is set to the PHS mode. If the dual band portable phone 10 is out of the PHS service area 14, its operation mode remains unchanged so that a display section displays the PHS out-of-area state.

This is followed by the GSM position registration (Step S11). In the GSM position registration, the channel number indicative of a control channel is searched and stored in the GSM control channel storage section 52 of the memory section 5, as will be described later in more detail. When the dual band portable phone 10 is not set to the PHS mode and located in the GSM service area 12, its position is registered to the GSM base station 11 and its operation mode is set to the GSM mode. On the other hand, when the dual band portable phone 10 is not set to the PHS mode and located out of the GSM service area 12, its operation mode remains unchanged so that the display section displays the GSM out-of-area state.

It is then checked whether or not the dual band portable phone 10 is in the PHS mode (Step S12). When it is determined to be the PHS mode, the control goes to the PHS standby state (Step S13). In the PHS standby state, a broadcast calling channel (PCH) transmitted from the PHS base station 13 in a predetermined interval of one or two seconds can be received.

When it is determined that the phone 10 is out of the PHS service area 14, it is checked whether or not the dual band portable phone 10 is set to the GSM mode (Step S14). When it is determined that the dual band portable phone 10 stays in the GSM service area 12, the control goes to the GSM standby state (Step S15). In the GSM standby state, a broadcast calling channel (PCH) emitted in a predetermined interval of one or two seconds from the GSM base station 11 can be received. When it is determined that the phone 10 is out of the GSM service area 12, the power is turned off (Step S16).

Through the above process, when the power supply is turned on, the dual band portable phone 10 registers its position to the PHS base station 13 if the position registration is possible and is also set to the PHS mode. This allows the dual band portable phone 10 to be used in the PHS mode. In this case, the channel number of the GSM control channel is saved in the GSM control channel storage section 52 of the memory section 5.

On the contrary, when the position registration to the PHS base station 13 is impossible and the position registration to the GSM base station 11 is possible, the position is registered to the GSM base station 11 and the operation mode is switched to the GSM mode. This allows the dual band portable phone 10 to be used in the GSM mode. Also, the channel number of the GSM control channel is saved in the GSM control channel storage section 52 of the memory section 5. In case that its position cannot be registered to the GSM base station, the dual band portable phone 10 is out of the operation so that its power supply is turned off.

(2) PHS Position Registration

Figure 4:
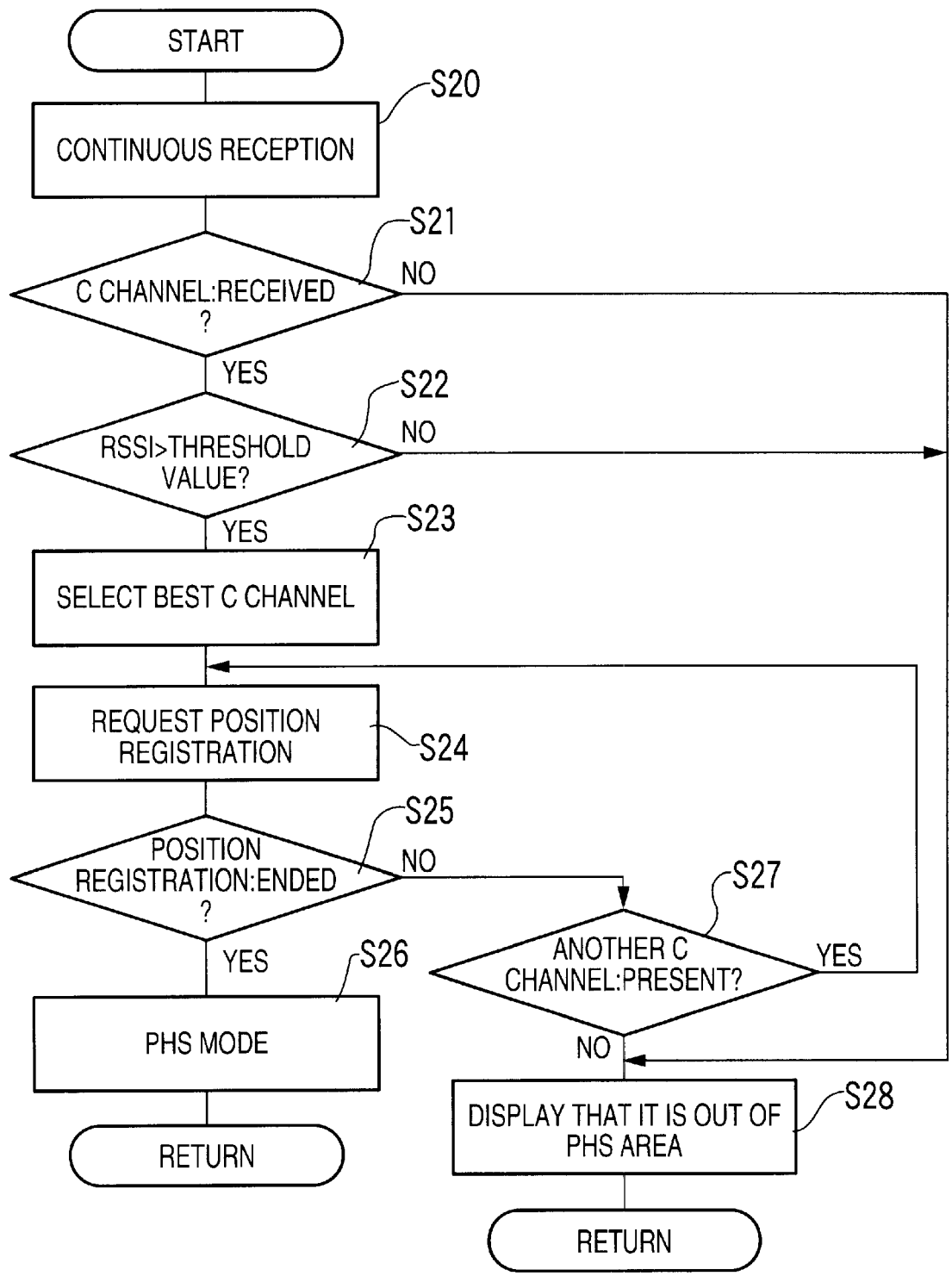
FIG. 4 is a flowchart showing the control of a PHS position registration process of the dual band portable phone according to the embodiment of the present invention.

The PHS position registration carried out at Step S10 will be described in more detail referring to the flowchart shown in FIG. 4. The routine of the PHS position registration is called at Step S10 of the initial process routine.

In the PHS mode, the channel number of the control channel (CcH) is stored in the PHS control channel storage section 51 of the memory section 5. The common control section 4 instructs the PHS radio section 2 to continuously receive a signal for a period of, e.g., 300 ms (Step S20). More particularly, the common control section 4 controls the PHS radio section 2 to turn up the frequency of the control channel corresponding to the channel number stored in the PHS control channel storage section 51. Then, the PHS radio section 2 demodulates the received signal. The demodulated signal is supplied to the common control section 4.

In response to the demodulated signal, the common control section 4 checks whether or not electromagnetic wave of the control channel is received during the period of 300 ms (Step S21). When it is determined that the control channel electromagnetic wave is not received, the PHS out-of-area state is displayed (Step S28). In practice, the common control section 4 supplies the display section 9 with a predetermined data. Then, the display section 9 displays a message or a symbol indicating that the phone 10 is out of the PHS service area 14. Then, the control returns back to Step S11 of the initial process routine.

When it is determined that the control channel is received at Step S21, it is checked whether the reception electric field intensity level (RSSI) of the control channel is greater than a threshold value predetermined in the system, i.e., 40 dB $\mu$V/m (Step S22). When it is determined that the control channel electromagnetic wave having a field level greater than the threshold value is not received, the control jumps to Step S28 such that the PHS out-of-area state is displayed.

When it is determined at Step S22 that one or more control channel electromagnetic waves having field levels greater than the threshold value are received, a process is performed to select the optimum control channel (Step S23). As the plural control channel electromagnetic waves having a field levels greater than the threshold value have been received, they are allocated with priority levels in the order of larger field level. The control channel electromagnetic wave having the highest priority is selected as the optimum control channel.

Then, the position registration request is issued (Step S24). That is, the common control section 4 transmits the position registration request to the PHS base station 13 which has transmitted the optimum control channel. More specifically, the position registration request is sent from the common control section 4 to the PHS radio section 2, is modulated and amplified by the PHS radio section 2, and then transmitted via the common antenna 1 to the PHS base station 13. It is then examined whether the position registration is completed or not (Step 525). This process is implemented by checking whether a data indicative of the completion of the position registration has been received from the PHS base station 13.

When it is determined that the position registration is completed, the operation mode of the dual band portable phone 10 is set to the PHS mode (Step S26). More particularly, data of the PHS mode is saved in the PHS control channel storage section 51 of the memory section 5. Then, the control returns back to Step S11 of the initial process routine.

When it is determined at Step S25 that the position registration is not completed, i.e. the data of completion of the position registration is not properly received from the PHS base station 13, it is checked whether the other control channels are present (Step S27). In other words, it is examined whether control channel electromagnetic wave having the second highest priority is available or not. When it is determined that the control channel electromagnetic wave having the second highest priority level is available, the control channel electromagnetic wave having the second highest priority is selected as the optimum control channel. Then, the control goes back to Step S24. The position registration request as described above is issued to the PHS base station 13 which has transmitted the control channel electromagnetic wave having the second highest priority. When it is determined at Step S27 that the other control channels are not available, the control advances to Step S28 for display of the PHS out-of-area state.

By repeating a succession of Steps S24, S25, S27, S24, and so on, a group of the control channels are examined whether or not the position can be registered to the corresponding PHS base station 13. As a result, the control channel corresponding to the highest priority level is registered in the PHS base station 13. When non of the PHS base stations 13 is available for the position registration, the PHS out-of-area state is displayed.

(3) GSM Position Registration

Figure 5:
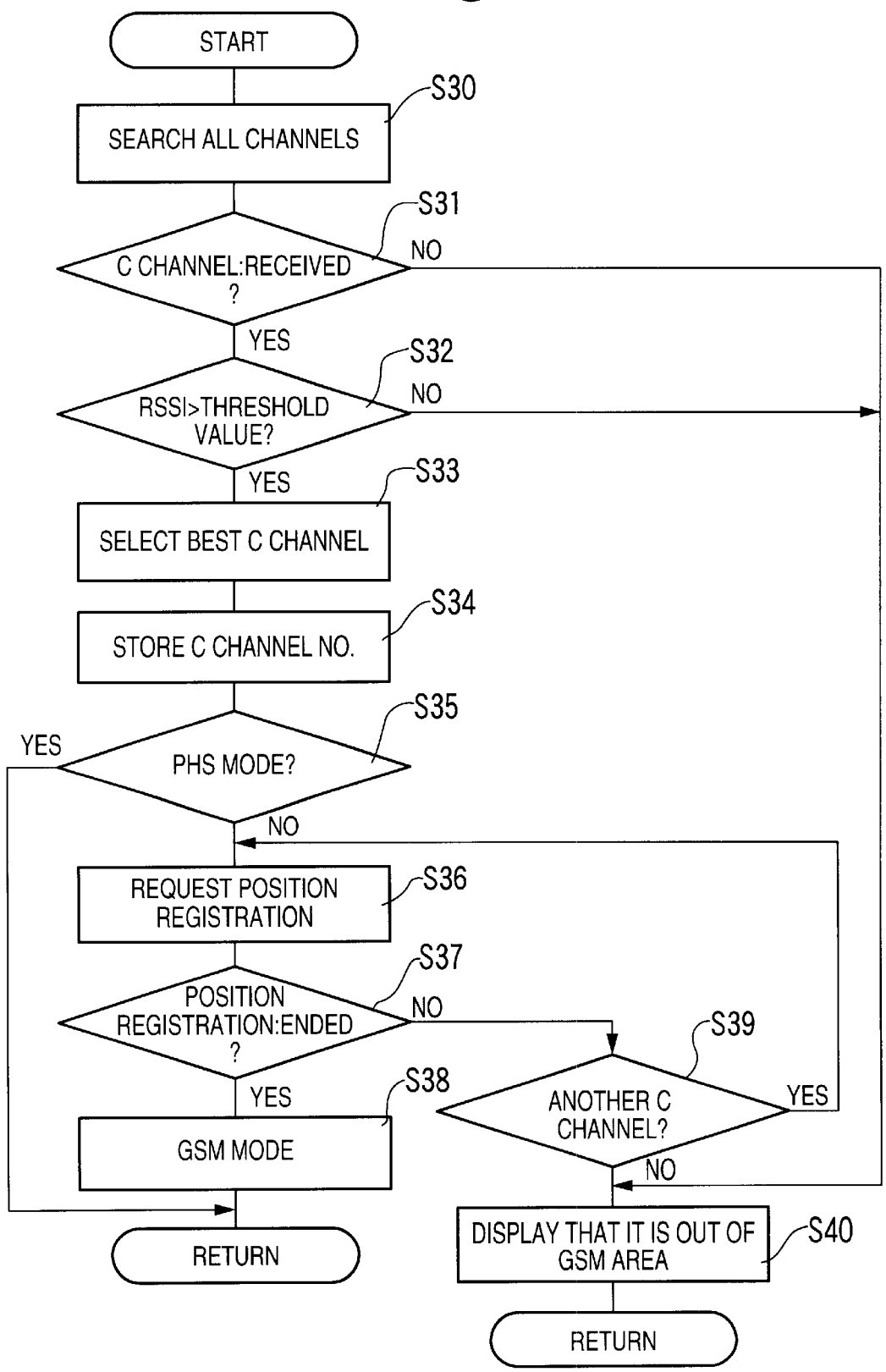
FIG. 5 is a flowchart showing the control of a GSM position registration process of the dual band portable phone according to the embodiment of the present invention.

The GSM position registration carried out at Step S11 will be now described in more detail with reference to the flowchart shown in FIG. 5. The routine of the GSM position registration is called at Step S11 of the initial process routine.

In the GSM mode, unlike the PHS mode, the channel number of the control channel has not been determined in advance but arbitrarily determined by the operator or the GSM base station 11. When the position registration is requested, a process of checking all the control channels is performed. The following description is made in respect of the aspects distinguished from those of the PHS mode.

First, a process of checking all the control channels is performed (Step S30). More specifically, the common control section 4 controls the GSM radio section 3 to sequentially tune up frequencies corresponding to all the channel numbers. The GSM radio section 3 demodulates the received signals. The resultant demodulated signal is supplied to the common control section 4. Then, the common control section 4 examines whether or not the control channel electromagnetic wave is received (Step S31).

When it is determined that the control channel electromagnetic wave is not received, the control jumps to Step S40 for display of the GSM out-of-area state (Step S40). More particularly, the common control section 4 sends a predetermined data to the display section 9 which in turn displays a message or a symbol indicating that the phone 10 is out of the GSM service area 12. The control then returns back to Step S12 of the initial process routine.

When it is determined at Step S31 that the control channel electromagnetic wave is received, it is checked whether the reception electric field intensity level (RSSI) of the control channel electromagnetic wave is greater than a threshold value determined by the system (Step S32). When it is determined that the control channel electromagnetic wave having a field level greater than the threshold value is not received, the control jumps to Step S40 for display of the GSM out-of-area state.

When it is determined at Step S32 that one or more control channel electromagnetic waves having field levels greater than the threshold value are received, the selection of the optimum control channel is carried out (Step S33). As the control channel electromagnetic waves having field levels greater than the threshold value have been received, they are allocated with priority levels in the order of their field level. Accordingly, the control channel with the highest priority is selected as the optimum control channel.

Next, the channel numbers of all the control channels are stored in the GSM control channel storage section 52 of the memory section 5 (Step S34). The channel, numbers stored in the GSM control channel storage section 52 are referred when the operation mode of the dual band portable phone 10 or the mobile phone system is switched to another system.

Next, it is then examined whether the current mode is the PHS mode or not (Step S35). This step is implemented by checking the mode data of the current operation mode stored in the mode storage section 50 of the memory section 5. When it is found that the current mode is the PHS mode, it is recognized that the PHS position registration has been conducted. Therefore, the control goes back to Step S12 of the initial process routine without carrying out the GSM position registration starting from Step S36.

When it is determined at Step S35 that the current operation mode is not the PHS mode, it is recognized that the PHS position registration has not yet been conducted Therefore, the GSM position registration starting from Step S36 is carried out. The GSM position registration starts with a position registration request (Step S36). More particularly, the common control section 4 supplies the position registration request via the GSM radio section 3 to the GSM base station 11. In response, the GSM radio section 3 modulates, amplifies, and transmits the position registration request to the GSM base station 11 via the common antenna 1. Then, it is examined whether the position registration is completed or not (Step S37). This process is implemented by examining whether or not a data of completion of the position registration is properly received from the GSM base station 11.

When it is determined that the position registration is completed, the operation mode of the dual band portable phone 10 is set to the GSM mode (Step S38). More specifically, a data indicative of the GSM mode is saved in the GSM control channel storage section 52 of the memory section 5. Then, the control returns back to Step S12 of the initial process routine.

When it is determined at Step S37 that the position registration is not completed, i.e. the data of completion of the position registration is not properly received from the GSM base station 11, it is checked whether another candidate of the control channel is present (Step S39). In other words, it is examined whether or not the other control channel electromagnetic wave having a priority level is received. When it is found that the other control channel is present, the control channel with the second highest priority is selected as the optimum control channel and the control goes back to Step S36. Then, the position registration request is issued to the GSM base station 11 which has transmitted the optimum control channel as described previously. On the other hand, when it is determined at Step S39 that the other control channel with priority level is not present, the control jumps to Step S40 for display of the GSM out-of-area state.

By repeating a succession of the steps S36, S37, S39, S36, and so on, it is determined whether or not the position registration is possible in order from the GSM base station 11 which has transmitted the control channel with the highest priority. As a result, the control channel corresponding to the highest priority is registered in the GSM base station 11. When non of the GSM base stations 11 is available for the position registration, the GSM out-of-area state is display sectioned.

(4) Mobile Phone System Switching

Figure 6:
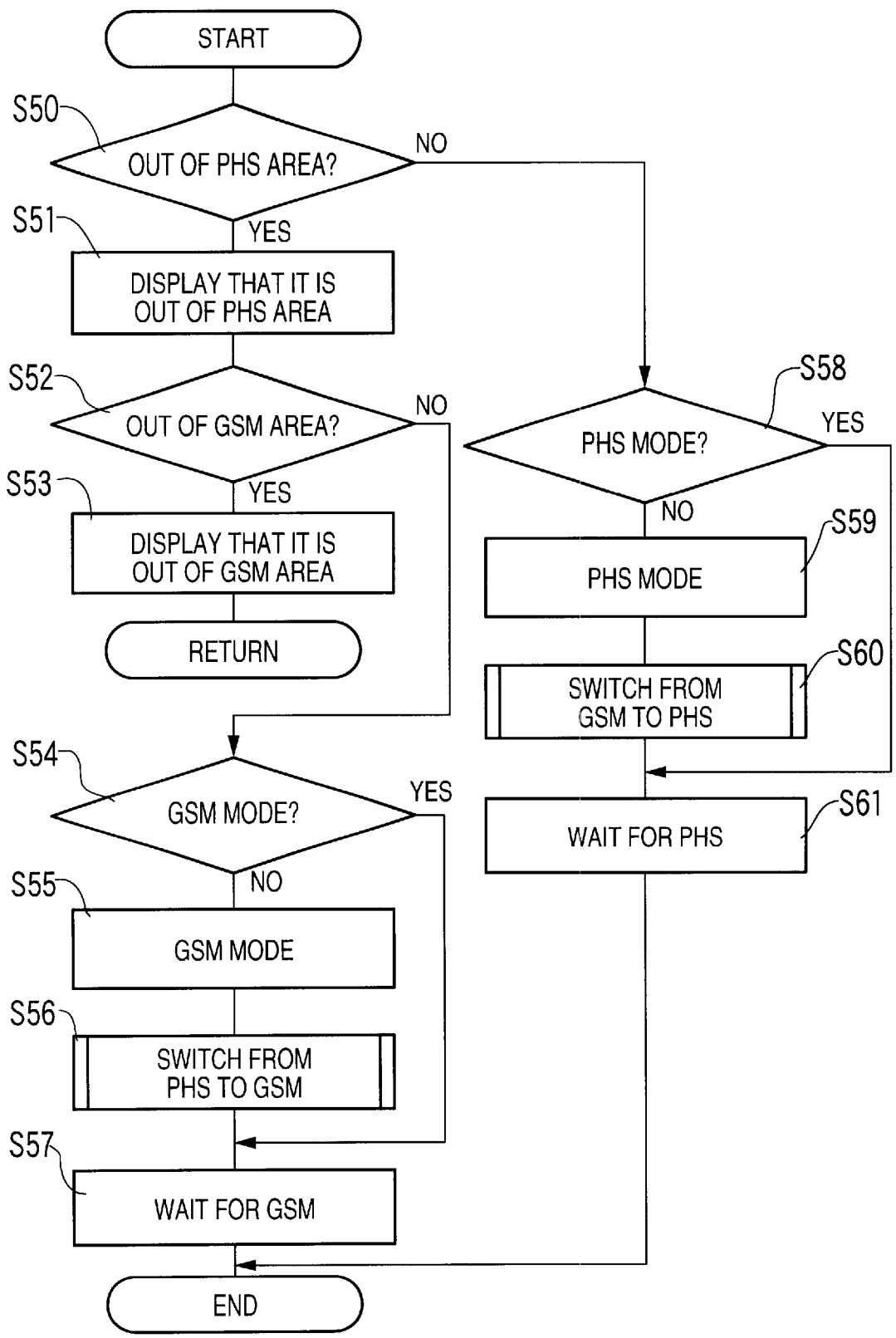
FIG. 6 is a flowchart showing the control of mobile phone system switching of the dual band portable phone according to the embodiment of the present invention.
Figure 7:
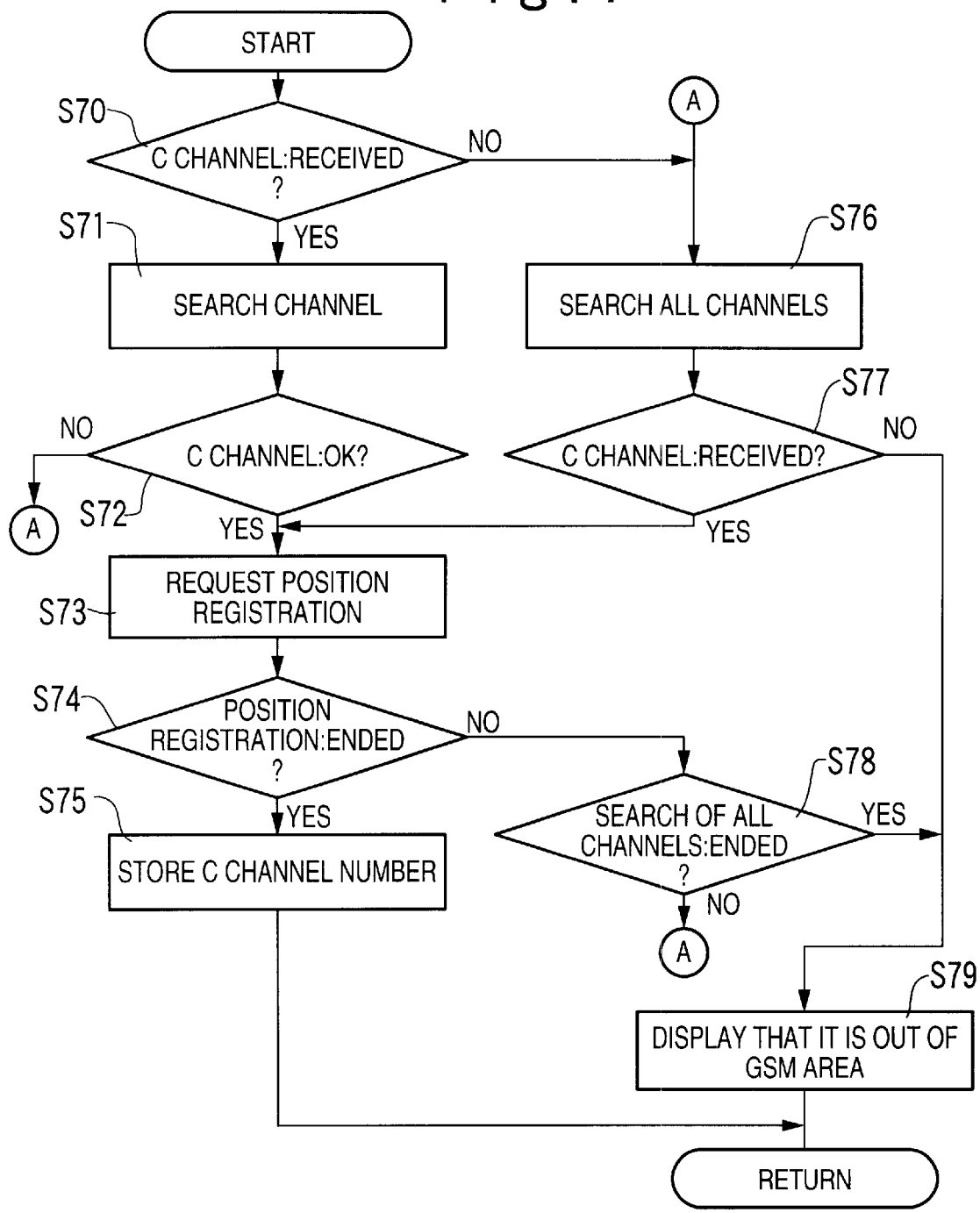
FIG. 7 is a flowchart showing the control of mobile phone system switching of the dual band portable phone according to the embodiment of the present invention.

The switching of the mobile phone system between the PHS system and the GSM system will be described in more detail with reference to the flowcharts shown in FIGS. 6 and 7. The routine of the mobile phone system switching is started in response to a mode switching request, i.e., a timer interrupt operation generated for every predetermined time interval by a timer (not shown).

In the mobile phone system switching routine, it is checked whether or not the dual band portable phone 10 is out of the PHS service area 14, namely in its PHS out-of-area state (Step S50). This step is implemented in the same manner as of the PHS position registration routine (See FIG. 4). When it is determined that the phone 10 is out of the PHS service area 14, the PHS out-of-area state is displayed (Step S51). Then, it is checked whether or not the dual band portable phone 10 is out of the GSM service area 12, namely, in its GSM out-of-area state (Step S52). This step is implemented in the same manner as of the GSM position registration routine (See FIG. 5). When it is determined that the portable phone 10 is out of the GSM service area 12, the GSM out-of-area state is displayed (Step S53). The control then returns back to a step where the interruption is generated.

When it is determined at Step S52 that the portable phone 10 is in the GSM service area 12, it is checked whether the operation mode of the dual band portable phone 10 is the GSM mode (Step S54). When it is determined that the operation mode is not the GSM mode, it is recognized that the dual band portable phone 10 operating in the PHS mode has been move from the PHS area to the GSM area. As a result, the operation mode of the portable phone 10 is set to the GSM mode (Step S55).

Next, a process of switching the mobile phone system from the PHS system to the GSM system is performed (Step S56). This process will be described later in more detail. Then, the dual band portable phone 10 enters a GSM standby mode (Step S57). When it is determined at Step S54 that the operation mode is the GSM mode, it is recognized that the operation mode remains unchanged. As a result, the control jumps to Step S57 for calling the GSM standby mode.

When it is determined at Step S50 that the dual band portable phone 10 is in the PHS service area, it is checked whether the operation mode of the phone 10 is the PHS mode (Step S58). When it is determined that the operation mode is not the PHS mode, it is recognized that the dual band portable phone 10 operating in the GSM mode is moved into the PHS service area. As a result, the operation mode of the phone 10 is switched to the PHS mode (Step S59).

Next, a process of switching the operation mode from the GSM mode to the PHS mode (Step S60). This process is substantially the same as the operation of Step S56 (which will be described later in more detail) and its description will be omitted. Then, the dual band portable phone 10 enters a PHS standby mode (Step S61). When it is determined at Step S58 that the operation mode is the PHS mode, it is recognized that the operation mode remains unchanged. Therefore, the control jumps to Step S61 for calling the PHS standby mode.

The switching of the mobile phone system from the PHS system to the GSM system carried out at Step S56 will be now described in more detail with reference to the flowchart shown in FIG. 7. This switching process is performed in response to the mode switching request or the timer interrupt request, as described above.

In this process, the common control section 4 checks whether or not the channel number of the GSM control channel is saved in the GSM control channel storage section 52 of the memory section 5 (Step S70). When it is determined that the channel number is saved, the common control section 4 controls the GSM radio section 3 to receive the control channel electromagnetic wave corresponding to by the channel number and subsequently searches the control channel (Step S71).

Subsequently, it is checked whether or not the GSM control channel electromagnetic wave corresponding to the channel number has been received correctly (Step S72). When it is determined that the GSM control channel electromagnetic wave has been received correctly, the position registration is requested (Step S73). This process is the same as the process at Step S36. Subsequently, it is examined whether the position registration is completed or not (Step S74). This step is the same as the process to Step S37.

When it is determined that the position registration is not completed, i.e. a data indicative of completion of the position registration is not received from the GSM base station 11, it is checked whether all the control channels have been checked for searching the GSM control channel (Step S78). When it is determined that all the control channels have not been checked, the control branches to Step S76 to check the remaining control channels. When it is determined that all the control channels have been checked, the control branches to Step S79 for display of the GSM out-of-area state (Step S79).

When it is determined at Step S74 that the position registration is completed, the channel number of the control channel at this time is saved in the GSM control channel storage section 52 of the memory section 5 (Step S75). Then, the control returns back to Step S57 (See FIG. 6) such that the dual band portable phone 10 enters the GSM standby mode. Accordingly, the routine of the mobile phone system switching is terminated.

When it is determined at Step S70 that the channel number is not saved in the GSM control channel storage section 52 of the memory section 5, all the control channels are checked (Step S76). This step is the same as that of Step S30. Subsequently, the common control section 4 checks whether a control channel electromagnetic wave is received on one of the control channel electromagnetic waves (Step S77).

When it is determined that the control channel electromagnetic wave is not received, the control branches to Step S79 for display of the GSM out-of-area state. Accordingly, the routine of the mobile phone system switching is terminated. On the other hand, when it is determined at Step S77 that the control channel electromagnetic wave is received, the control goes to Step S73 for the position registration.

In the above description, the dual band portable phone operable is described which can be applied to two mobile phone systems of the PHS and GSM systems. However, the present invention is not limited to the mobile phone systems. The present invention may be applicable to any other dual band portable phone in which at least one of two different mobile phone systems allows the control channel to be determined through checking of all the channels.

As described above, according to the present invention, when the dual band portable phone is moved from a PHS service area to a GSM service area, a process of searching all the channels can be omitted by storing the channel number of control channel in advance. Therefore, as the dual band portable phone is moved out from the PHS service area, it can readily search and identify the control channel for the GSM system, hence minimizing a time until the GSM standby mode is set.

Also, since the time required for searching the GSM control channel is decreased, the initiation of the GSM radio section and thus the consumption of electric current can be minimized. The dual band portable phone is decreased in the power consumption and its waiting time will be increased.

What is claimed is:

1. A dual band portable phone comprising:
a first mobile phone system used in a first mode;
a second mobile phone system used in a second mode;
a storing section having a mode area for storing a mode data indicative of a current operation mode, a first area for storing a first control channel data indicative of a first control channel used for said first mobile phone system in said first mode, and a second area for storing a second control channel data indicative of a second control channel used for said second mobile phone system in said second mode, the mode data indicating said first mode;
a control section for performing a position registration of said portable phone using said second control channel data stored in said storing section to set said second mode, when a first radio communication using said first mobile phone system becomes impossible while said first radio communication is performed in said first mode, and for performing a second radio communication using said second mobile phone system,
wherein said control section performs a position registration of said portable phone using said first control channel data stored in said storing section in response to a mode change request while said second radio communication is performed in said second mode, sets said first mode in response to the position registration of said portable phone using said first control channel data, and performs a radio communication using said first mobile phone system, further comprising a timer, and
wherein said mode change request is issued by said timer when said portable phone in said second mode is located in a service area of said first mobile phone system.

2. A dual band portable phone according to claim 1, wherein said control section performs said position registration of said portable phone using said second control channel data stored in said storing section to set said second mode, when said portable phone is moved out of a first service area of said first mobile phone system while said first radio communication is performed in said first mode.

3. A dual band portable phone according to claim 1, wherein said control section transmits a position registration request to a station for said second mobile phone system using said second control channel data, and sets said mode data indicative of said second mode in said storing section in response to a position registration completion notice from said station to set said second mode.

4. A dual band portable phone according to claim 1, wherein said mode change request is issued when said portable phone is moved out of a service area of said second mobile phone system and into a service area of said first mobile phone system.

5. A dual band portable phone according to claim 1, wherein said mode change request is issued when said portable phone is located in a service area of said second mobile phone system and is moved into a service area of said first mobile phone system.

6. A dual band portable phone according to claim 1, wherein said control section acquires said first control channel data and said second control channel data in response to a start request, to store in said storing section.

7. A dual band portable phone according to claim 1, wherein said start request is issued when a power supply of said portable phone is turned on.

8. A dual band portable phone according to claim 6, wherein said control section sets said mode data indicative of said first mode in said storing section when both of said first control channel data and said second control channel data are acquired or when said first control channel data is acquired.

9. A dual band portable phone according to claim 8, wherein said control section sets said mode data indicative of said second mode in said storing section when said second control channel data is acquired and when said first control channel data is not acquired.

10. A dual band portable phone according to claim 6, wherein said control section selects one having the highest reception electric field intensity level from among control channels for each of said first and second mobile phone systems to store a data corresponding to said one having the highest reception electric field intensity level in said storing section.

11. A dual band portable phone according to claim 1, wherein said first mobile phone system is a PHS system and a second mobile phone system is a GSM system.

12. A method of performing communication in a dual band portable phone comprising:

performing communication using a first mobile phone system in a first mode, a position registration having been performed using said first mobile phone system based on a first control channel indicative of a first predetermined channel;

switching from said first mobile phone system to a second mobile phone system using a second control channel data indicative of a second channel predetermined such that a second mode is set; and continuing said communication using said second mobile phone system in said second mode, further comprising:

performing a position registration of said portable phone using said first control channel data in response to a mode change request while said communication is performed in said second mode;

setting said first mode in response to the position registration of said portable phone using said first control channel data;

continuing said communication using said first mobile phone system, wherein said mode change request is issued by a timer when said portable phone is located in a service area of said first mobile phone system and an operation unit is operated.

13. A method according to claim 12, wherein said switching includes performing a position registration of said portable phone using said second control channel data to set said second mode, when said portable phone is moved out of a first service area of said first mobile phone system while said first radio communication is performed in said first mode.

14. A method according to claim 12, wherein said switching includes:

transmitting a position registration request to a station for said second mobile phone system using said second control channel data; and setting said second mode in response to a position registration completion notice from said station.

15. A method according to claim 12, wherein said mode change request is issued when said portable phone is moved out of a service area of said second mobile phone system and into a service area of said first mobile phone system.

16. A method according to claim 12, wherein said mode change request is issued when said portable phone is located in a service area of said second mobile phone system and is moved into a service area of said first mobile phone system.

17. A method according to claim 12, further comprising:

acquiring said first control channel data and said second control channel data in response to a start request.

18. A method according to claim 17, wherein said start request is issued when a power supply of said portable phone is turned on.

19. A method according to claim 12, wherein said first mobile phone system is a PHS system and a second mobile phone system is a GSM system.

\* \* \* \* \*